(12) United States Patent  
Hofmeister et al.

(10) Patent No.: US 6,379,812 B1  
(45) Date of Patent: Apr. 30, 2002

(54) HIGH MODULUS, MULTILAYER FILM

(75) Inventors: Frank M. Hofmeister, Mauldin; Paul J. Satterwhite; Thomas D. Kennedy, both of Simpsonville, all of SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/583,853

(22) Filed: May 31, 2000

(51) Int. Cl.⁷ .................. B32B 27/08; B32B 27/34; B32B 7/04; B32B 1/08
(52) U.S. Cl. ............. 428/474.4; 428/34.1; 428/34.3; 428/34.6; 428/34.7; 428/34.9; 428/35.4; 428/35.9; 428/474.7; 428/474.9
(58) Field of Search .............. 428/34.1, 34.3, 428/34.6, 35.9, 34.7, 34.9, 35.7, 474.7, 474.4, 35.4, 474.9

(56) References Cited

U.S. PATENT DOCUMENTS

| 4,410,661 A | 10/1983 | Epstein et al. ............ 525/66 |
| 4,640,852 A | 2/1987 | Ossian ................. 428/35 |
| 4,746,562 A | 5/1988 | Fant .................. 428/213 |
| 4,800,129 A * | 1/1989 | Deak ................. 428/474.4 |
| 5,110,855 A | 5/1992 | Blatz ................. 524/441 |
| 5,208,082 A * | 5/1993 | Chou ................. 428/36.6 |
| 5,491,009 A | 2/1996 | Bekele ................. 428/35.7 |
| 5,707,750 A | 1/1998 | Degrassi et al. ......... 428/475.8 |
| 5,837,358 A * | 11/1998 | Bauer et al. .............. 428/213 |
| 6,274,228 B1 * | 8/2001 | Ramesh et al. ........... 428/34.9 |

FOREIGN PATENT DOCUMENTS

| EP | 0 800 915 A2 | 10/1997 |
| NZ | 222632 | 11/1987 |
| WO | 99/56951 | 11/1999 |

OTHER PUBLICATIONS

"Engineering Resins Grivory G21", EMS–CHEMIE AG, Apr. 20, 1989, Dr. S. Schaaf.

* cited by examiner

*Primary Examiner*—P. Hampton-Hightower  
(74) *Attorney, Agent, or Firm*—Thomas C. Lagaly

(57) ABSTRACT

A multilayer film, comprising, in the following order:
  a. a first layer consisting essentially of amorphous polyamide;
  b. a second layer adhered to a surface of the first layer; and
  c. a third layer adhered to a surface of the second layer, the third layer comprising at least one member selected from ethylene/vinyl alcohol copolymer, polyamide MXD6, polyamide MXD6/MXDI, polyvinylidene chloride, and polyacrylonitrile.

28 Claims, 2 Drawing Sheets

HIGH MODULUS, MULTILAYER FILM

BACKGROUND OF THE INVENTION

The present invention relates to packaging materials of a type employing flexible, polymeric films. More specifically, the invention pertains to multilayer packaging films used in applications requiring a high degree of dimensional stability, i.e., both low shrinkage and low stretch, at elevated temperatures, and also a relatively low oxygen transmission rate.

Packaging applications requiring dimensionally stable films at high temperatures, e.g., up to about 120° C. and sometimes as high as about 130° C., include vertical form-fill-seal (VFFS) packaging for "hot fill" products, such as soups, sauces, jellies, beverages, and other liquified foods, which are normally maintained at about 80° C. to about 100° C. during packaging. As is well known, in VFFS packaging, a flowable product is introduced through a central, vertical fill tube and into a formed tubular film having been heat-sealed transversely at its lower end and longitudinally. After being filled, the package, in the form of a pouch, is completed by transversely heat-sealing the upper end of the tubular segment, and severing the pouch from the tubular film above it, usually by applying sufficient heat to melt through the tube above the newly formed upper heat-seal. If the film from which the package is made does not have sufficient dimensional stability, the package becomes distorted both from the heated product and from the heat-sealing. Not only does package distortion ruin the aesthetic qualities of the package, e.g., by distorting any printed information or other labeling on the package, but it can cause the package to become mis-aligned in the packaging machinery, often resulting in ruined packages and costly downtime in production as mis-aligned packages become wedged between pieces of the machinery or when heat-sealing/severing equipment inadvertently contacts and melts through the walls of the package instead of sealing and severing at the periphery of the package as intended.

Similar considerations apply in VFFS and horizontal form/fill/seal (HFFS) packaging of flowable particulate products, e.g., shredded cheese, frozen chicken wings and nuggets, etc. Although such products are generally not filled while in a heated state, transverse and longitudinal heat-sealing and heat-severing alone are sufficient to cause package distortion, thereby making a film which is dimensionally stable at elevated temperatures highly desirable for such packaging applications.

Another packaging application for which high-temperature dimensional film stability would be desirable is when films are used as lidding materials for: flexible packages such as thermoformed pockets for, e.g., hot dogs, lunch meats, etc.; semi-rigid vacuum and/or gas-flushed packages for meat and poultry contained in a foam or other semi-rigid type tray; and rigid packages, e.g., for yogurt, custard and other dairy products contained in a rigid cup-like container. When lidding films are applied to such packages, heat is generally used to seal the film to the thermoformed container, tray, or cup in which the product is contained. Without sufficient dimensional stability, the lidding films can either stretch or shrink during the lidding process, resulting in incompletely sealed packages and distorted printed images on the films.

A further process necessitating dimensional stability at elevated temperatures is printing. Maintenance of color-to-color registration on the printing press is important, as is overall consistency of the "repeat length" of each printed image. Drying tunnel temperatures commonly reach temperatures of 200 degrees F. (93 degrees C.). It is therefore preferred that the film have sufficient resistance to stretching, necking and other types of deformation at these temperatures so that registration is not lost, and that the repeat length of the images are consistently maintained on downstream packaging equipment, where it may again face elevated temperatures as noted above.

Films that are dimensionally stable at high temperatures would generally tend to be relatively stiff at room temperatures. This attribute is highly desirable when the film is made into a stand-up pouch for, e.g., soups, sauces, beverages, and particulates, when it is thermoformed into a pocket and lidded, and when it is used as a lidding film. Thus, not only would a film having high-temperature dimensional stability be able to withstand the rigors of the packaging process without distortion, but the resultant package would be stiff, which is advantageous in certain packaging applications such as those listed immediately above.

Another requirement of films used in many of the aforementioned packaging applications is a low transmission rate of oxygen in order to preserve and extend the shelf life of packaged food products. For many food products, the oxygen transmission rate (OTR) must be on the order of 40 $cc/m^2$ per 24 hours at 1 atmosphere or less.

In order to achieve the above properties, many conventional packaging films used for such applications have been laminates, i.e., two or more film components that are adhesively bonded together, e.g., biaxially-oriented and heat-set polypropylene, polyester, or polyamide films that are adhesively laminated to a heat-sealable film where one of the laminated film components contains a low OTR material such as polyvinylidene chloride. However, adhesive lamination is expensive, due to the relatively high cost of the adhesives and the extra production steps required to produce the laminate, and the reliability of such adhesives is sometimes suspect, e.g., solvents from printing inks can reduce the bond-strength of the adhesives, leading to delamination. Further, certain types of adhesives contain migratable components that can migrate through films and contact the packaged food products.

Instead of using a laminate, it would be preferred to use a film that is fully coextruded, i.e., formed by extruding two or more polymeric materials through a single die with two or more orifices arranged so that the extrudates merge and weld together into a multilayer structure.

A proposed coextruded film having high-temperature dimensional stability and a low OTR includes a core layer of ethylene/vinyl alcohol copolymer (EVOH) bonded on both surfaces to layers comprising amorphous nylon, which may or may not be blended with a crystalline polyamide such as polyamide 12, 612, 6/66, etc. While amorphous polyamide is advantageous in that it provides relatively high modulus at high temperatures, thereby imparting high-temperature dimensional stability to a film in which it is incorporated, amorphous polyamide exhibits poor adhesion to EVOH, resulting in a film that will too easily delaminate. Blending crystalline polyamide with amorphous polyamide improves the bond strength to EVOH, but at the cost of greatly decreasing the modulus of the amorphous polyamide layers, and therefore of the entire film, at high temperatures.

Accordingly, there is a need in the art for a fully coextruded, multilayer film having a combination of high-temperature dimensional stability, low OTR, and sufficient inter-laminar bond-strength to be useful for commercial packaging applications.

SUMMARY OF THE INVENTION

That need is met by the present invention which provides a multilayer film, comprising, in the following order:

a. a first layer consisting essentially of amorphous polyamide;

b. a second layer adhered to a surface of the first layer; and c. a third layer adhered to a surface of the second layer, the third layer comprising at least one member selected from ethylene/vinyl alcohol copolymer, polyamide MXD6, polyamide MXD6/MXDI, polyvinylidene chloride, and polyacrylonitrile. Such materials provide the film with a low oxygen transmission rate, i.e., less than or equal to 30 cc of oxygen per square meter of film per 24 hour period at 1 atmosphere and at a temperature of 73° F. (at 0% relative humidity).

Advantageously, the second layer is adhered to each of the first and third layers at a bond strength of at least 0.5 lb$_f$/inch. In addition, the film has a storage modulus of greater than 30,000 pounds/in$^2$ at 120° C. for excellent dimensional stability at elevated temperatures.

DETAILED DESCRIPTION OF THE INVENTION

Figure 1:
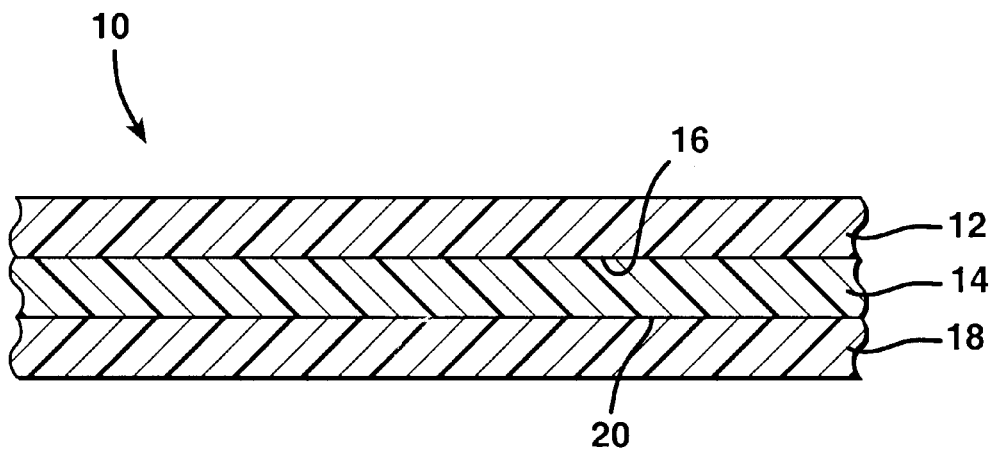
FIG. 1 is a cross-sectional view of a multilayer film in accordance with the present invention.

FIG. 1 shows a multilayer film 10 in accordance with the present invention having, in order, a first layer 12 consisting essentially of amorphous polyamide, a second layer 14 adhered to a surface 16 of the first layer 12, and a third layer 18 adhered to a surface 20 of the second layer 14. As used herein, the term "multilayer film" refers to a thermoplastic material, generally in sheet or web form, having one or more layers formed from polymeric or other materials which are bonded together by any conventional or suitable method, including one or more of the following methods: coextrusion, extrusion coating, lamination, vapor deposition coating, solvent coating, emulsion coating, or suspension coating, but preferably by coextrusion.

Third layer 18 functions as an oxygen barrier layer, and preferably has an oxygen transmission rate (OTR) of less than or equal to 30 cc of oxygen per square meter of film per 24 hour period at 1 atmosphere and at a temperature of 73° F. (at 0% relative humidity). In this manner, the entire film 10 will have such OTR. More preferably, layer 18, and therefore film 10, has an OTR of less than 25 cc/m$^2$ per 24 hours at 1 atm., and more preferably less than 20, more preferably still less than 15, even more preferably less than 10, such as less than 8, less than 7, or less than 6 cc/m$^2$ per 24 hours at 1 atm. (73° F. and 0% RH). Examples of suitable materials for third layer 18 include at least one member selected from ethylene/vinyl alcohol copolymer (EVOH), polyamide MXD6, polyamide MXD6/MXDI, polyvinylidene chloride (PVDC), and polyacrylonitrile (PAN), including copolymers of PVDC and PAN. EVOH is preferred.

By virtue of first layer 12 consisting essentially of amorphous polyamide, film 10 has a storage modulus of greater than 30,000 pounds/in$^2$ at 120° C. (storage modulus being determined in accordance with ASTM 5026-95a). Because of this relatively high storage modulus at temperatures up to 120° C., film 10 has excellent high-temperature dimensional stability. More preferably, the multilayer film 10 has a storage modulus of greater than 40,000 pounds/in$^2$ at 120° C.

Small amounts of additives such as slip or antiblock agents, pigments, processing aids and the like can be included in first layer 12, as long as they do not materially affect the basic characteristics of film 10, e.g., by causing the storage modulus of the film to fall below 30,000 pounds/in$^2$ at 120° C. or by adversely affecting the inter-laminar bond-strength of the film. Specifically, crystalline or semi-crystalline polyamide is not present in first layer 12, as this detrimentally affects the modulus of amorphous polyamide, as demonstrated in the Examples below (see Example 3).

As used herein, the term "amorphous polyamide" refers to those polyamides which are lacking in crystallinity as shown by the lack of an endotherm crystalline melting peak in a Differential Scanning Calorimeter (DSC) test (ASTM D-3417). Examples of such polyamides include those amorphous polymers prepared from the following diamines: hexamethylenediamine, 2-methylpentamethylenediamine, 2,2,4-trimethylhexamethylenediamine, 2,4,4-trimethylhexamethylenediamine, bis(4-aminocyclohexyl)methane, 2,2-bis(4-aminocyclohexyl)isopropylidine, 1,4-diaminocyclohexane, 1,3-diaminocyclohexane, meta-xylylenediamine, 1,5-diaminopentane, 1,4-diaminobutane, 1,3-diaminopropane, 2-ethyldiaminobutane, 1,4-diaminomethylcyclohexane, p-xylylenediamine, m-phenylenediamine, p-phenylenediamine, and alkyl substituted m-phenylenediamine and p-phenylenediamine. Examples of amorphous polyamides that can be used also include those amorphous polymers prepared from the following dicarboxylic acids: isophthalic acid, terephthalic acid, alkyl substituted iso- and terephthalic acid, adipic acid, sebacic acid, butane dicarboxylic acid, and the like. The diamines and dicarboxylic acids mentioned above can be combined as desired, provided the resulting polyamide is amorphous. For example, an aliphatic diamine can generally be combined with an aromatic dicarboxylic acid, or an aromatic diamine can generally be combined with an aliphatic dicarboxylic acid to give suitable amorphous polyamides. Preferred amorphous polyamides are those in which either the diamine or the dicarboxylic acid moiety is aromatic, and the other moiety is aliphatic. The aliphatic groups of these polyamides preferably contain between 4 and 12 carbon atoms in a chain or an aliphatic cyclic ring system having up to 15 carbon atoms. The aromatic groups of the polyamides preferably have mono or bicyclic aromatic rings which may contain aliphatic substituents of up to about 6 carbon atoms.

The amorphous polyamide in first layer 12 preferably has a glass transition temperature of at least about 120° C., and may comprise, e.g., at least one member selected from polyamide 6I/6T, polyamide 66/69/6I, and polyamide 66/610/MXD6. Examples of commercially available amorphous polyamide 6I/6T polymers include Grivory™ G21 nylon from EMS, Selar™ PA 3426 from DuPont, and Novatec™ X21 from Mitsubishi Chemical.

Another aspect of the present invention is that the second layer 14 is adhered to each of the first and third layers 12 and 18, respectively, at a bond strength of at least 0.5 lb$_f$/inch (ASTM F 904). More preferably, the bond strength between second layer 14 and first layer 12, and between second layer 14 and third layer 18, is at least about 0.7 lb$_f$/inch.

One of the primary functions served by second layer 14 is as a bonding layer, i.e., to bond first layer 12 with third layer 18. When third (barrier) layer 18 comprises EVOH, for example, the inventors have determined that the bond strength between EVOH and amorphous polyamide is insufficient for commercial packaging applications (see Example 3). Selection of the material used in the second layer 14 to maintain an inter-laminar bond strength of at least 0.5 lb$_f$/inch will depend upon the material selected for third layer 18. That is, the material selected for second layer 14 must be capable of bonding to both amorphous polyamide (first layer 12) and the barrier material present in third layer 18 at respective bond strengths of at least 0.5 lb$_f$/inch.

Accordingly, when the third layer 18 comprises at least one member selected from ethylene/vinyl alcohol copolymer, polyamide MXD6, and polyamide MXD6/MXDI, the second layer 14 preferably comprises at least one member selected from polyamide homopolymer or copolymer having greater than 50 mole percent polyamide 6, polyamide homopolymer or copolymer having greater than 50 mole percent polyamide 66, acid-modified polyolefins, and anhydride-modified polyolefins. Preferred polyamides in accordance with the foregoing include polyamide 6, polyamide 66, polyamide 6/66, polyamide 66/6, polyamide 6/69, polyamide 6/12, polyamide 66/610, and polyamide 66/69. Preferred examples of acid-modified polyolefins include ethylene/acrylic acid copolymer and ethylene/methacrylic acid copolymer. Preferred anhydride-modified polyolefins include anhydride-grafted ethylene/1-butene copolymer, anhydride-grafted ethylene/1-hexene copolymer, anhydride-grafted ethylene/1-octene copolymer, anhydride-grafted ethylene/vinyl acetate copolymer, and anhydride-grafted polypropylene.

As used herein, the term "anhydride-modified" refers to any form of anhydride functionality, such as the anhydride of maleic acid, fumaric acid, etc., whether grafted onto a polymer, copolymerized with a polymer, or blended with one or more polymers, and is also inclusive of derivatives of such functionalities, such as acids, esters, and metal salts derived therefrom.

When the third layer 18 comprises at least one member selected from polyvinylidene chloride and polyacrylonitrile, the second layer 14 preferably comprises an ethylene copolymer or terpolymer having between 5 and 30 mole % ester mer units. Such ester mer units may include, for example, methacrylate, n-butyl acrylate, iso-butyl acrylate, ethyl acrylate, vinyl acetate (e.g., ethylene/methacrylate copolymer, etc.). An example of a suitable terpolymer may comprise 80% ethylene, 10% iso-butyl acrylate, and 10% methacrylic acid.

Multilayer film 10 may be made by any suitable and known film-making process, e.g., cast or blown through either an annular or flat die, and is preferably fully coextruded. As used herein, the term "coextruded" refers to the process of extruding two or more materials through a single die with two or more orifices arranged so that the extrudates merge and weld together into a laminar structure before chilling and solidifying, e.g., via water, chilled metal roll, or air quenching. Multilayer film 10 preferably has less than 5% shrink in at least one direction at 120° C. Thus, it is preferred that the film is not oriented after coextrusion or, if it is, that it be heat-set to remove substantially all of the shrink capability from the film. This property, i.e., less than 5% shrink at 120° C., along with a storage modulus of greater than 30,000 pounds/in$^2$ at 120° C., results in a film with excellent dimensional stability, both at room temperature and at higher temperatures, e.g., up to about 120° C., as encountered during many food packaging processes as discussed hereinabove.

Multilayer film 10 may have any desired thickness, e.g., ranging from about 0.5 to about 50 mils. More preferably, the thickness ranges from 0.5–40 mils, more preferably still from about 0.5–30 mils, yet more preferably from about 0.5–20 mils, even more preferably from about 1–15 mils, still more preferably from about 1–10 mils, and most preferably from 1–5 mils, such as from 1.5–4 mils.

Figure 2:
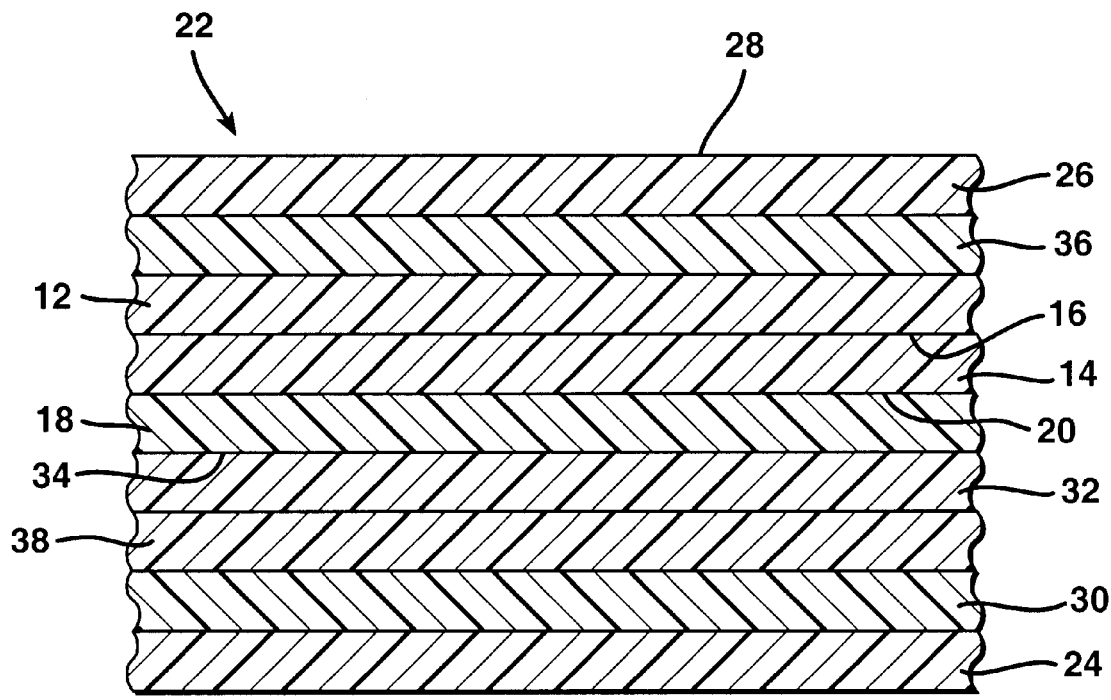
FIG. 2 is a cross-sectional view of another multilayer film in accordance with the invention.

Referring now to FIG. 2, a nine-layer embodiment of a multilayer film in accordance with the present invention will be described. Multilayer film 10 may be used alone, i.e., as a three-layer film. For certain packaging applications, it may be beneficial to include the three-layer film 10 as a substructure in a larger multilayer film. In such a configuration, the larger multilayer film incorporating film 10 as a substructure would possess all of the properties and benefits resulting from the three-layer structure of film 10 as discussed above, but would also possess additional properties and benefits arising from the additional layers.

Multilayer film 22 in FIG. 2 is an example of such a larger multilayer film, containing layers 12, 14, and 18 as interior layers. That is, in multilayer film 22, second layer 14 is adhered to surface 16 of first layer 12 (consisting essentially of amorphous polyamide), and third (barrier) layer 18 is adhered to surface 20 of second layer 14. In film 22, however, all three layers 12, 14, and 18 are interior layers. As used herein, the phrase "interior layer" refers to any layer of a multilayer film having both of its principal surfaces directly adhered to another layer of the film.

Multilayer film 22 preferably includes a fourth, exterior layer 24 comprising a material that is capable of forming a heat-seal. As used herein, the phrase "exterior layer" refers to any layer of a multilayer film having only one of its principal surfaces directly adhered to another layer of that film. In a multilayer film, there are two exterior layers, each of which has a principal surface adhered to only one other layer of the film. The other principal surface of each of the two exterior layers forms the two principal outer surfaces of the film.

As used herein, the term "heat-seal" refers to the union of two films by bringing the films into contact, or at least close proximity, with one another and then applying sufficient heat and pressure to a predetermined area (or areas) of the films to cause the contacting surfaces of the films in the predetermined area to become molten and intermix with one another, thereby forming an essentially inseparable bond between the two films in the predetermined area when the heat and pressure are removed therefrom and the area is allowed to cool.

Examples of suitable materials for fourth, exterior layer 24 include ionomers (e.g., SURLYN from DuPont), heterogeneous (Zeiger-Natta catalyzed) ethylene/alpha-olefin copolymer such as linear low density polyethylene, homogeneous (metallocene or single-site catalyzed) ethylene/alpha-olefin copolymer, ethylene/vinyl acetate copolymer, ethylene/methyl acrylate copolymer, ethylene/propylene copolymer, polybutylene homopolymer or copolymer, and other similar materials that are capable of forming a heat-seal.

Multilayer film 22 preferably further comprises a fifth, exterior layer 26 comprising a material having a surface energy of at least 36 dynes/cm$^2$. Such a surface energy allows an image to be printed on outer surface 28 of fifth layer 26. Suitable materials for fifth layer 26 include at least one material selected from polyamides, polyesters, polycarbonates, polyurethanes, and polyacrylates. Polyolefin surfaces having been modified by corona, plasma, flame treatment or acid etching such that the surface energy exceeds 36 dynes/cm$^2$ are also suitable for printing. Fifth layer 26 also preferably provides heat- and abuse-resistance to the film. A semi-crystalline polyamide such as polyamide 6 is preferred.

Multilayer film 22 may further comprise a sixth, interior layer 30 positioned generally between the third and fourth layers 18, 24, e.g., adjacent fourth layer 24 as shown. It is preferred to include sixth layer 30 to balance any tendency of fifth layer 26 to cause the film 22 to curl, which may occur if layer 26 contracts to a greater or lesser degree than the other layers of the film upon cooling. For example, when fifth layer 26 is a crystalline or semi-crystalline material, such as a semi-crystalline polyamide, it contracts to a greater degree upon cooling than the other film layers and, being an exterior layer, exerts a curling force on the film such that the film tends to curl towards the fifth layer. This tendency can be offset by including in sixth layer 30 a material that balances the crystallinity of fifth layer 26, i.e., a crystalline or semi-crystalline material. Thus, sixth layer 30 preferably comprises at least one material selected from high density polyethylene, low density polyethylene, linear low density polyethylene, polypropylene, polyamide, and polyesters. High density polyethylene is preferred because it has sufficient crystallinity to balance that of a semi-crystalline polymer in layer 26, such as polyamide 6, and also adheres well to materials from which the fourth (heat-seal) layer 24 is preferably constructed.

Multilayer film 22 may further comprise a seventh layer 32 adhered to a surface 34 of third layer 18. The seventh layer 32 may be formed from the same material(s) as second layer 14, and thus may comprise at least one member selected from polyamide homopolymer or copolymer having greater than 50 mole percent polyamide 6, polyamide homopolymer or copolymer having greater than 50 mole percent polyamide 66, acid-modified polyolefins, anhydride-modified polyolefins, ethylene/acrylic acid copolymer, ethylene/methacrylic acid copolymer, and ethylene copolymer or terpolymer having between 5 and 30 mole % ester mer units. Preferred materials include at least one member selected from polyamide 6, polyamide 66, polyamide 6/66, and polyamide 66/6.

Polymeric adhesive layers may be included in multilayer film 22 wherever necessary or desired. Thus, a first polymeric adhesive layer 36 may be included between first layer 12 and fifth layer 26 and a second polymeric adhesive layer 38 may be included between sixth layer 30 and seventh layer 32. Layers 36 and 38 may comprise any suitable polymeric adhesive, such as an olefin polymer or copolymer having an anhydride functionality grafted thereon and/or copolymerized therewith and/or blended therewith. Examples of suitable polymeric adhesives include the following anhydride-grafted polymers: ethylene/1-butene copolymer, ethylene/1-hexene copolymer, ethylene/1-octene copolymer, ethylene/vinyl acetate copolymer, polypropylene, and low density polyethylene.

The invention will now be further described in the following examples.

EXAMPLES

The materials used in the examples are identified below:
1. PA6-1: CAPRON B100WP; a polyamide 6 resin having a density of 1.135 g/cc (ASTM 1505) and a melting point of 220° C.; purchased from Honeywell of Hopewell, Va.
2. aPA: GRIVORY G21; an amorphous polyamide with a glass transition temperature of 125° C. and a density of 1.18 g/cc (ASTM 1505); obtained from EMS of Sumter, S.C.
3. PA6-2: ULTRAMID KR-4407; a polyamide 6 resin having a density of 1.14 g/cc (ASTM 1505) and a melting point of 220° C., containing less than 1% combined talc and silicon oil; purchased from BASF of Mount Olive, N.J.
4. PA666: ULTRAMID C35; a polyamide 6/66 copolymer having a density of 1.14 g/cc; purchased from BASF of Mount Olive, N.J.
5. MB1: GRILON XE 3361; a polyamide 6 masterbatch containing 5% talcum (magnesium silicate), 5% calcium carbonate, and 5% n,n'-ethylene bis stearamide with a density of 1.140 g/cc (ASTM 1505) and a melting point of 220° C.; purchased from EMS of Sumter, S.C.
6. MB2: CLARIANT 1080864S; a polyamide 6 masterbatch containing 20% diatomaceous earth and 10% erucamide with a density of 1.20 g/cc (ASTM 1505) and a melting point of 220° C.; purchased from Clariant of Minneapolis, Minn.
7. MB3: AMPACET 10853: a linear low density polyethylene based masterbatch containing 19.4% diatomaceous earth with a melt index of 1.5 g/min (ASTM 1238) and a density of 1.00 g/cc (ASTM 1505); obtained from Ampacet of De Ridder, La.
8. MB4: FSU 255E; a LDPE-based masterbatch containing 25% diatomaceous silica and 5% erucamide; obtained from Schulmer.
9. EVOH: SOARANOL ET; an ethylene/vinyl alcohol copolymer having 38% ethylene, a melt index of 3.2 (ASTM 1238) and a density of 1.17 g/cc (ASTM 1505); obtained from Nippon Goshei, supplied by Soarus of Arlington Heights, Ill.
10. TIE-1: TYMOR 1228B, an anhydride-grafted polyolefin resin having a melt index of 2.1 (ASTM 1238) and a density of 0.921 g/cc (ASTM 1505); purchased from Rohm and Haas of Philadelphia, Pa.
11. TIE-2: BYNEL CXA 39E660; an anhydride-grafted polyolefin in ethylene/vinyl acetate having a melt index of 2.4 (ASTM 1238) and a density of 0.943 g/cc (ASTM 1505); obtained from DuPont of Wilmington, Del.
12. HDPE: FORTIFLEX J60-500-119; a high density polyethylene with a melt index of 6.2 g/min (ASTM 1238) and a density of 0.961 (ASTM 1505); obtained form Solvay Polymers of Houston, Tex.
13. LLDPE: EXCEED 361C33: a homogeneous ethylene hexene-1 copolymer with a melt index of 4.5 g/min (ASTM 1238) and a density of 0.917 g/cc (ASTM 1505) purchased from Exxon Mobil of Houston, Tex.
14. LDPE: ESCORENE LD200.48; a low density polyethylene with a melt index of 7.5 g/min (ASTM 1238) and a density of 0.917 g/cc (ASTM 1505); obtained from Exxon Mobil of Houston, Tex.

Example 1

With reference to FIG. 2, a multilayer film in accordance with the present invention had the following nine-layer structure (total film thickness ranging from 3.3–3.5 mils):
Layer 24: 88% LLDPE+10% LDPE+2% MB3 (20% of total thickness of layers 1–9).
Layer 30: HDPE (19% of total thickness of layers 1–9).
Layer 38: TIE-1 (8% of total thickness of layers 1–9).
Layer 32: PA6-1 (6.5% of total thickness of layers 1–9).
Layer 18: EVOH (6% of total thickness of layers 1–9).
Layer 14: PA6-1 (6.5% of total thickness of layers 1–9).
Layer 12: aPA (10% of total thickness of layers 1–9).
Layer 36: TIE-2 (11% of total thickness of layers 1–9).
Layer 26: 96% PA6-2+2% MB1+2% MB2 (13% of total thickness of layers 1–9).

The film was fully coextruded and produced by a cast coextrusion process using an annular die, followed by a water quench upon exiting the die.

Example 2

Again with reference to FIG. 2, a multilayer film in accordance with the present invention was made as described in Example 1 and had the following nine-layer structure (total film thickness ranging from 3.6–3.7 mils):

Layer 24: 96% LLDPE+4% MB4 (15% of total thickness of layers 1–9).
Layer 30: HDPE (18% of total thickness of layers 1–9).
Layer 38: TIE-1 (6% of total thickness of layers 1–9).
Layer 32: PA6-1 (6.5% of total thickness of layers 1–9).
Layer 18: EVOH (6% of total thickness of layers 1–9).
Layer 14: PA6-1 (6.5% of total thickness of layers 1–9).
Layer 12: aPA (18% of total thickness of layers 1–9).
Layer 36: TIE-2 (14% of total thickness of layers 1–9).
Layer 26: 96% PA6-2+2% MB1+2% MB2 (10% of total thickness of layers 1–9).

The films of Examples 1 and 2 where subjected to the following tests:

1) Normalized Impact Total Energy (NITE); tested in accordance with ASTM D 3763; expressed in ft-lb per mil of film thickness.
2) Storage Modulus; tested in both the machine direction (MD) and transverse direction (TD) in accordance with ASTM D 5026-90; expressed in psi (pounds/in$^2$).
3) Curl Rating; a subjective observation of each film's tendency to curl or lay flat when placed on a flat surface at room temperature; a scale of 1 to 5 was used with "1" indicating excellent flatness and "5" indicating highly problematic curling.
4) Shrinkage; tested in accordance with ASTM D 2732 at 150° C.
5) Oxygen Transmission Rate; tested in accordance with ASTM D 3985; expressed as cc of oxygen per square meter of film per 24 hour period at 1 atmosphere and at a temperature of 73° F. (at 0% relative humidity).

The results are summarized in Table 1.

TABLE 1

| Test | Example 1 | Example 2 |
| --- | --- | --- |
| NITE (ft-lb/mil) @ 73° F. | 0.155 | 0.194 |
| NITE (ft-lb/mil) @ 41° F. | 0.086 | 0.103 |
| NITE (ft-lb/mil) @ 32° F. | 0.082 | 0.084 |
| Storage Modulus at 80° C. MD/TD (psiX1000) | 65/71 | 82/84 |
| Storage Modulus at 100° C. MD/TD (psiX1000) | 57/57 | 78/76 |
| Storage Modulus at 120° C. MD/TD (psiX1000) | 48/47 | 65/62 |
| Storage Modulus at 140° C. MD/TD (psiX1000) | 12/15 | 11/14 |
| Storage Modulus at 150° C. MD/TD (psiX1000) | 10/10 | 8/8 |
| Curl Rating (1[excellent]-5[poor]) | 1 | 1 |
| Shrinkage LD/TD (%) | 0/0 | 0/0 |
| Oxygen Transmission Rate | 5.41 | 4.58 |

Figure 3:
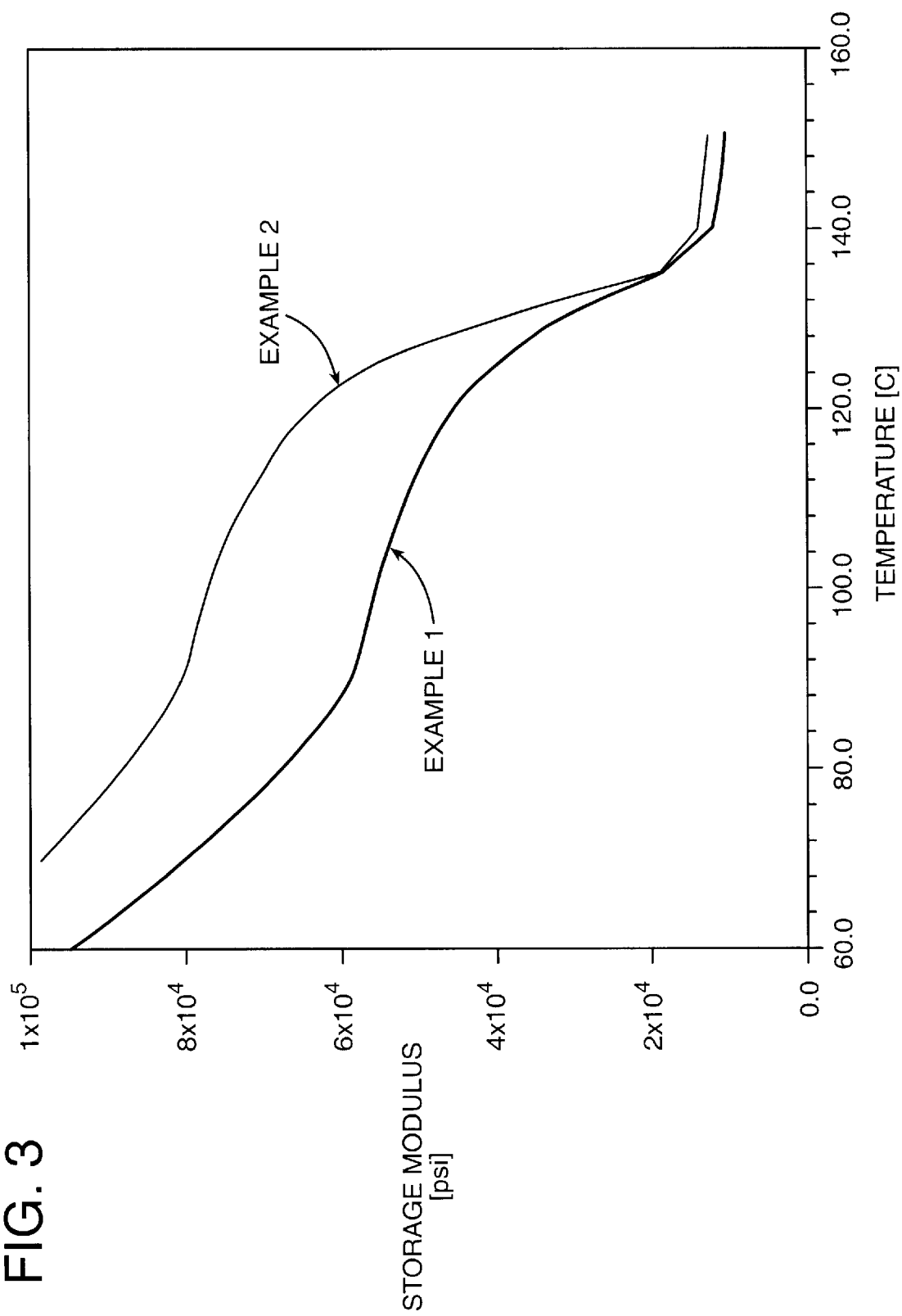
FIG. 3 is a graph showing storage modulus vs. temperature for two films in accordance with the invention.

As indicated in Table 1, the films of Examples 1 and 2 maintain high modulus, i.e., greater than 30,000 psi, at temperatures exceeding 120° C., i.e., up to about 130° C. This is illustrated graphically in FIG. 3 (machine direction only). In addition, both films exhibited 0% shrink at 150° C., and therefore have 0% shrink at lower temperatures, e.g., at 130° C., 120° C., etc. These properties, i.e., high modulus and no shrink at elevated temperatures, result in excellent dimensional stability at high temperatures such as are experienced during various packaging operations as discussed hereinabove. While films having such a high modulus might suffer the drawback of being overly brittle, the impact test results (NITE) indicate that the films are sufficiently ductile throughout the tested temperature range for commercial packaging applications.

The data in Table 1 also indicates that the films have excellent flatness, i.e., a very low tendency to curl. This greatly facilitates the handling and processing of the films during packaging, particularly as the films are being moved and manipulated in the packaging machinery. Finally, the films also exhibit a very low OTR, a highly beneficial property for the packaging of perishable items such as food products.

Example 3

In order to determine the effects of blending amorphous polyamide with crystalline polyamide on both (1) bond strength with EVOH and (2) modulus, various two-layer films containing a 1 mil layer of EVOH bonded to a 4 mil layer of either amorphous polyamide, polyamide 6/66 copolymer, or blends thereof, were constructed by cast coextrusion. The structure of those films may be summarized as follows (where a"/" indicates the interface of the two layers and all percentages are weight percentages):

Sample 1: 100% aPA/EVOH
Sample 2: 90% aPA+10% N666/EVOH
Sample 3: 75% aPA+25% N666/EVOH
Sample 4: 50% aPA+50% N666/EVOH
Sample 5: 100% N666/EVOH Each of the film samples was tested for interlayer bond-strength (ASTM F 904), Young's modulus at 25° C. (ASTM D 882), and storage modulus (ASTM 5026-90) at various temperatures. The bond-strength and Young's modulus data is summarized in Table 2.

TABLE 2

| SAMPLE | BOND STRENGTH (lb$_f$/inch) | YOUNG'S MODULUS (psi) |
| --- | --- | --- |
| 1 | 0.03 | 346,000 |
| 2 | 0.08 | 335,000 |
| 3 | 0.46 | 343,000 |
| 4 | Inseparable | 220,000 |
| 5 | (not tested) | (not tested) |

Films having interlayer bond-strengths of less than about 0.5 lb$_f$/inch are generally considered unsuitable for commercial packaging applications. Thus, the films of Samples 1, 2, and 3, having 100%, 90%, and 75% amorphous polyamide, respectively, would not be suitable for commercial packaging use, whether such films were used alone or as a subcomponent of a larger, multilayer film. In other words, Applicants have found that film layers containing more than 50% amorphous polyamide in a blend with polyamide 6/66 or other crystalline polyamide, have an inadequate bond strength with EVOH. Only when the amount of amorphous polyamide decreases to below about 50% does the bond-strength increase sufficiently to be acceptable for commercial use.

However, as also indicated in Table 2, the Young's modulus of the films decreased with increasing amounts of polyamide 6/66 blended with the amorphous polyamide. This phenomenon was shown much more clearly when the film samples underwent storage modulus testing at increasing temperatures ranging from 0° C. to 146° C. as indicated in Table 3 below.

TABLE 3

STORAGE MODULUS (PSI)

| Temp (° C.) | 100% aPA (Sample 1) | 90% aPA + 10% PA666 (Sample 2) | 75% aPA + 25% PA666 (Sample 3) | 50% aPA + 50% PA666 (Sample 4) | 100% PA666 (Sample 5) |
|---|---|---|---|---|---|
| 0 | 415,000 | 409,000 | 258,000 | 332,000 | 380,000 |
| 5 | 408,000 | 402,000 | 250,000 | 328,000 | 361,000 |
| 10 | 399,000 | 394,000 | 244,000 | 327,000 | 336,000 |
| 15 | 391,000 | 386,000 | 239,009 | 325,000 | 305,000 |
| 20 | 383,000 | 377,000 | 235,000 | 317,000 | 270,000 |
| 25 | 374,000 | 368,000 | 233,000 | 282,000 | 240,000 |
| 30 | 362,000 | 354,000 | 236,000 | 219,000 | 207,000 |
| 35 | 342,000 | 325,000 | 237,000 | 123,000 | 137,000 |
| 40 | 328,000 | 298,000 | 251,000 | 81,403 | 103,000 |
| 45 | 314,000 | 282,000 | 233,000 | 64,956 | 86,504 |
| 50 | 300,000 | 262,000 | 187,000 | 53,338 | 75,179 |
| 55 | 285,000 | 242,000 | 134,000 | 44,933 | 65,353 |
| 60 | 275,000 | 227,000 | 96,702 | 38,197 | 58,159 |
| 65 | 269,000 | 205,000 | 77,055 | 33,279 | 52,725 |
| 70 | 262,000 | 177,000 | 65,747 | 27,499 | 49,270 |
| 76 | 254,000 | 150,000 | 54,798 | 22,832 | 47,043 |
| 81 | 242,000 | 129,000 | 46,353 | 18,976 | 45,383 |
| 86 | 231,000 | 120,000 | 38,822 | 16,264 | 44,385 |
| 91 | 222,000 | 114,000 | 31,137 | 15,089 | 43,315 |
| 96 | 223,000 | 116,000 | 23,956 | 14,714 | 41,942 |
| 101 | 230,000 | 132,000 | 16,041 | 14,680 | 40,362 |
| 105 | 231,000 | 150,000 | 9,533 | 14,090 | 38,043 |
| 111 | 233,000 | 145,000 | 6,571 | 12,812 | 35,440 |
| 116 | 207,000 | 111,000 | 5,414 | 11,286 | 33,229 |
| 121 | 206,000 | 55,095 | 4,666 | 10,316 | 31,095 |
| 126 | 200,000 | 13,945 | 4,000 | 9,939 | 29,138 |
| 131 | 139,000 | 4,838 | 3,443 | 9,752 | 27,462 |
| 136 | 37,221 | 3,403 | 3,071 | 9,440 | 25,646 |
| 141 | 4,188 | 2,736 | 2,499 | 8,937 | 23,904 |
| 146 | 2,338 | 2,223 | 0 | 8,522 | 22,006 |

As shown by the results in Table 3, the storage modulus of sample 2–5 decrease dramatically relative to sample 1 as the temperature of the film samples increases. This is particularly noteworthy in a comparison of sample 1 (100% amorphous PA/EVOH) with sample 2, which is the same as sample 1 except for the addition of 10% PA 6/66 copolymer with the amorphous PA layer. Between about 116 and 121° C., the modulus of sample 2 dropped steeply to 55,095 psi and then to 13,945 psi between 121 and 126° C. In contrast, the modulus of sample 1 remained well above 100,000 psi even as the temperature increased above 130° C. Accordingly, a layer consisting essentially of 100% amorphous polyamide is important in achieving high-temperature stiffness/dimensional stability. Even the addition of as little as 10% crystalline polyamide has a dramatic detrimental effect on the high-temperature modulus property of the amorphous PA layer.

Since the amorphous PA-containing layer is principally responsible for providing high temperature stiffness to the multilayer films of the present invention, which stiffness effect is diminished by the other lower modulus layers of the film, it is preferred not to blend crystalline polyamide with the amorphous polyamide when high temperature dimensional stability is desired of such multilayer film. At the same time, since amorphous polyamide has been determined to exhibit very poor bonding with EVOH, it is highly advantageous to include a suitably strong bonding layer, such as crystalline polyamide, between the amorphous PA and EVOH layers in accordance with the present invention to obtain improved bond strength without sacrificing high-temperature modulus.

While the invention has been described with reference to illustrative examples, those skilled in the art will understand that various modifications may be made to the invention as described without departing from the scope of the claims which follow.

What is claimed is:

1. A multilayer film, comprising, in the following order:
   a. a first layer consisting essentially of amorphous polyamide;
   b. a second layer adhered to a surface of said first layer; and
   c. a third layer adhered to a surface of said second layer, said third layer comprising at least one member selected from ethylene/vinyl alcohol copolymer, polyamide MXD6, polyamide MXD6/MXDI, polyvinylidene chloride, and polyacrylonitrile, wherein,
      said second layer is adhered to each of said first and third layers at a bond strength of at least 0.5 lb$_f$/inch, and
      said film has a storage modulus of greater than 30,000 pounds/in$^2$ at 120° C.

2. The multilayer film of claim 1, wherein said amorphous polyamide in said first layer has a glass transition temperature of at least about 120° C.

3. The multilayer film of claim 1, wherein said amorphous polyamide in said first layer comprises at least one member selected from polyamide 6I/6T, polyamide 66/69/6I, and polyamide 66/610/MXD6.

4. The multilayer film of claim 1, wherein said third layer comprises at least one member selected from ethylene/vinyl alcohol copolymer, polyamide MXD6, and polyamide MXD6/MXDI.

5. The multilayer film of claim 4, wherein said second layer comprises at least one member selected from polyamide homopolymer or copolymer having greater than 50 mole percent polyamide 6, polyamide homopolymer or copolymer having greater than 50 mole percent polyamide 66, acid-modified polyolefins, anhydride-modified polyolefins, ethylene/acrylic acid copolymer, and ethylene/methacrylic acid copolymer.

6. The multilayer film of claim 5, wherein said second layer comprises at least one member selected from polyamide 6, polyamide 66, polyamide 6/66, polyamide 66/6, polyamide 6/69, polyamide 6/12, polyamide 66/610, and polyamide 66/69.

7. The multilayer film of claim 1, wherein said third layer comprises at least one member selected from polyvinylidene chloride and polyacrylonitrile.

8. The multilayer film of claim 7, wherein said second layer comprises ethylene copolymer or terpolymer having between 5 and 30 mole % ester mer units.

9. The multilayer film of claim 1, wherein said film has less than 5% shrink in at least one direction at 120° C.

10. The multilayer film of claim 1, wherein said film has a storage modulus of greater than 40,000 pounds/in$^2$ at 120° C.

11. The multilayer film of claim 1, further comprising a fourth, exterior layer comprising a material that is capable of forming a heat-seal.

12. The multilayer film of claim 11, further comprising a fifth, exterior layer comprising a material having a surface energy of at least 36 dynes/cm$^2$.

13. The multilayer film of claim 12, wherein said fifth layer comprises at least one material selected from polyamides, polyesters, polycarbonates, polyurethanes, and polyacrylates.

14. The multilayer film of claim 12, further comprising a sixth layer positioned between said third and fourth layers, said sixth layer comprising at least one material selected from high density polyethylene, low density polyethylene, linear low density polyethylene, polypropylene, polyamide, and polyesters.

15. The multilayer film of claim 14, further comprising a seventh layer adhered to a surface of said third layer, said seventh layer comprising at least one member selected from polyamide homopolymer or copolymer having greater than 50 mole percent polyamide 6, polyamide homopolymer or copolymer having greater than 50 mole percent polyamide 66, acid-modified polyolefins, anhydride-modified polyolefins, ethylene/acrylic acid copolymer, ethylene/methacrylic acid copolymer, and ethylene copolymer or terpolymer having between 5 and 30 mole % ester mer units.

16. The multilayer film of claim 15, wherein said seventh layer comprises at least one member selected from polyamide 6, polyamide 66, polyamide 6/66, and polyamide 66/6.

17. The multilayer film of claim 1, wherein said film is coextruded.

18. The multilayer film of claim 1 having a thickness ranging from about 0.5 to about 50 mils.

19. The multilayer film of claim 1, wherein said film has an oxygen transmission rate of less than or equal to 30 cc of oxygen per square meter of film per 24 hour period at 1 atmosphere and at a temperature of 73° F. (at 0% relative humidity).

20. The multilayer film of claim 19, wherein said film has an oxygen transmission rate of less than or equal to 15 cc of oxygen per square meter of film per 24 hour period at 1 atmosphere and at a temperature of 73° F. (at 0% relative humidity).

21. A multilayer film, comprising, in the following order:
 a. a first layer consisting essentially of amorphous polyamide;
 b. a second layer adhered to a surface of said first layer; and
 c. a third layer adhered to a surface of said second layer, said third layer comprising at least one member selected from ethylene/vinyl alcohol copolymer, polyvinylidene chloride, and polyacrylonitrile, wherein,
  said second layer is adhered to each of said first and third layers at a bond strength of at least 0.5 $lb_f$/inch, and
  said film has a storage modulus of greater than 30,000 pounds/in$^2$ at 120° C.

22. The multilayer film of claim 21, wherein said third layer comprises ethylene/vinyl alcohol copolymer.

23. A multilayer film, comprising, in the following order:
 a. a first layer consisting essentially of amorphous polyamide;
 b. a second layer adhered to a surface of said first layer;
 c. a third layer adhered to a surface of said second layer, said third layer comprising at least one member selected from ethylene/vinyl alcohol copolymer, polyamide MXD6, polyamide MXD6/MXI, polyvinylidene chloride, and polyacrylonitrile;
 d. a fourth, exterior layer comprising a material that is capable of forming a heat-seal; and
 e. a fifth, exterior layer comprising a material having a surface energy of at least 36 dynes/cm$^2$, wherein,
  said second layer is adhered to each of said first and third layers at a bond strength of at least 0.5 $lb_f$/inch, and
  said film has a storage modulus of greater than 30,000 pounds/in$^2$ at 120° C.

24. The multilayer film of claim 23, wherein said fifth layer comprises at least one material selected from polyamides, polyesters, polycarbonates, polyurethanes, and polyacrylates.

25. The multilayer film of claim 23, further comprising a sixth layer positioned between said third and fourth layers, said sixth layer comprising at least one material selected from high density polyethylene, low density polyethylene, linear low density polyethylene, polypropylene, polyamide, and polyesters.

26. The multilayer film of claim 25, further comprising a seventh layer adhered to a surface of said third layer, said seventh layer comprising at least one member selected from polyamide homopolymer or copolymer having greater than 50 mole percent polyamide 6, polyamide homopolymer or copolymer having greater than 50 mole percent polyamide 66, acid-modified polyolefins, anhydride-modified polyolefins, ethylene/acrylic acid copolymer, ethylene/methacrylic acid copolymer, and ethylene copolymer or terpolymer having between 5 and 30 mole % ester mer units.

27. The multilayer film of claim 26, wherein said seventh layer comprises at least one member selected from polyamide 6, polyamide 66, polyamide 6/66, and polyamide 66/6.

28. A multilayer film, comprising, in the following order:
 a. a first layer consisting essentially of amorphous polyamide;
 b. a second layer adhered to a surface of said first layer; and
 c. a third layer adhered to a surface of said second layer, said third layer comprising at least one member selected from ethylene/vinyl alcohol copolymer, polyamide MXD6, polyamide MXD6/MXI, polyvinylidene chloride, and polyacrylonitrile, wherein,
  said second layer is adhered to each of said first and third layers at a bond strength of at least 0.5 $lb_f$/inch,
  said film has a storage modulus of greater than 30,000 pounds/in$^2$ at 120° C., and
  said film has an oxygen transmission rate of less than or equal to 15 cc of oxygen per square meter of film per 24 hour period at 1 atmosphere and at a temperature of 73° F. (at 0% relative humidity).

\* \* \* \* \*